US006203130B1

United States Patent
Montgelas et al.

(10) Patent No.: US 6,203,130 B1
(45) Date of Patent: Mar. 20, 2001

(54) ENHANCED TELECOMMUNICATIONS CABINET ASSEMBLY HAVING MOVABLE WIRING INTERCONNECT MANAGEMENT TRAY REMOVABLY SUPPORTING MODULAR INTERCONNECT PANELS

(75) Inventors: Rudolph A. Montgelas, West Hartford; Dale D. Martin, East Lyme; William G. Sobieski, Guilford, all of CT (US); Robert C. Brown, West Kingston, RI (US); Alan C. Miller, Madison, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/337,297

(22) Filed: Jun. 21, 1999

(51) Int. Cl.[7] .................................................. A47B 81/00
(52) U.S. Cl. ..................... 312/223.2; 312/311; 312/223.6
(58) Field of Search .............................. 312/223.1, 223.2, 312/223.6, 311, 322, 323, 257.1, 265.5, 265.6; 361/683, 684, 685, 724, 725, 726, 727

(56) References Cited

U.S. PATENT DOCUMENTS

| | | | |
|---|---|---|---|
| 4,937,806 | * | 6/1990 | Babson et al. .................... 361/683 X |
| 5,032,951 | * | 7/1991 | Schropp et al. ............... 312/223.2 X |
| 5,309,323 | * | 5/1994 | Gray et al. ..................... 312/332.1 X |
| 5,574,625 | * | 11/1996 | Ohgami et al. ............... 312/223.2 X |
| 5,587,877 | * | 12/1996 | Ryan et al. .................... 312/223.2 X |
| 5,755,497 | * | 5/1998 | Chang ................................ 312/223.2 |
| 5,777,845 | * | 7/1998 | Krum et al. ..................... 312/9.32 X |
| 5,816,673 | * | 10/1998 | Sauer et al. ................... 312/223.1 X |
| 5,859,767 | * | 1/1999 | Fontana ............................ 361/683 X |
| 5,896,273 | * | 4/1999 | Varghese et al. ............. 312/223.2 X |
| 5,912,801 | * | 6/1999 | Roy et al. ...................... 312/223.2 X |
| 5,949,645 | * | 9/1999 | Aziz et al. .................... 312/223.2 X |
| 5,978,212 | * | 11/1999 | Boulay et al. ................ 312/332.1 X |

* cited by examiner

Primary Examiner—Peter M. Cuomo
Assistant Examiner—Hanh V. Tran
(74) Attorney, Agent, or Firm—Michael R. Swartz (57) ABSTRACT

An enhanced telecommunications cabinet assembly for enclosing wiring interconnections includes a chassis defining an interior cavity, a movable interconnect management adapter tray positioned in the interior cavity of the chassis, a plurality of modular interconnect panels mounted on the movable adapter tray, and front and top covers on the chassis. The chassis has a bottom wall and a pair of opposite sidewalls extending upward therefrom so as to define the interior cavity between the sidewalls and above the bottom wall. The chassis further has a pair of lower guide members positioning the movable adapter tray in the interior cavity of the chassis for movement relative thereto. The movable adapter tray is capable of undergoing at least one of being lifted upward relative to the bottom wall for removal from the interior cavity of the chassis or being slidably moved forward and backward along the lower guide members on the bottom wall toward and away from front and rear end portions of the bottom wall of the chassis. The front and top covers are provided for enclosing the interior cavity of the chassis respectively at the front and top thereof so as to block access to the front and top of the movable adapter tray and modular interconnect panels thereon. The front and top covers also are movable for exposing the interior cavity at the front and top thereof so as to provide access to the front and top of the movable adapter tray and modular interconnect panels thereon.

10 Claims, 4 Drawing Sheets

ENHANCED TELECOMMUNICATIONS CABINET ASSEMBLY HAVING MOVABLE WIRING INTERCONNECT MANAGEMENT TRAY REMOVABLY SUPPORTING MODULAR INTERCONNECT PANELS

BACKGROUND OF THE INVENTION

1. Field of the Invention

The present invention generally relates to telecommunications cabinets enclosing wiring interconnections and, more particularly, is concerned with an enhanced telecommunications cabinet assembly having a movable wiring interconnect management tray removably supporting a plurality of modular interconnect panels.

2. Description of the Prior Art

The organization and management of voice and data telecommunications networks in building and office environments involves the provision of interconnect panel assemblies in or near work areas. These interconnect panel assemblies establish connection points for both horizontal and vertical runs of cables with one another or with patch cords providing routing to work stations. These interconnect panel assemblies further facilitate terminations between the horizontal cables and patch cords which remain undisturbed when the patch cords leading to the work stations have to be reconfigured to make changes in work station arrangements.

One prior art interconnect panel assembly, which is manufactured and sold by Hubbell Premise Wiring, a division of Hubbell Incorporated, of Stonington, Conn., includes an enclosure having a back wall with pairs of opposite end walls and side walls defining an interior cavity and an open front, and an interconnect panel mounted within the enclosure perpendicular to the back wall and extending across the interior cavity between the opposite side walls of the enclosure so as to divide the interior cavity thereof into separate technician and user chambers on opposite sides of the interconnect panel. These opposite sides of the interconnect panel are thus referred to respectively as the technician side and the user side. A pair of front closure doors which can be referred to as the technician door and the user door are hinged to the opposite end walls of the enclosure and can be closed and locked independently of one another relative to the interconnect panel so as to close the separate technician and user chambers. The interconnect panel has slots through which a plurality of devices in the form of adapters or connectors are fitted to and supported on the interconnect panel. Entry openings are provided through walls of the enclosure proximate the technician and user chambers to allow insertion of the ends of cabling such as fiber optic cables into the one chamber on the technician side of the interconnect panel and optical patch cords into the other chamber on the user side of the interconnect panel. The connectors have faces exposed on the technician side of the interconnect panel to which the ends of the fiber optic cables can be connected and faces exposed on the user side of the interconnect panel into which jacks or the like on the ends of the optical patch cords can be plugged. The chambers are also large enough to store slack portions of the cables and patch cords.

This one prior art interconnect panel assembly has performed well and has achieved general acceptance among optical fiber interconnect products in the commercial marketplace. However, as with all products, a need may arise from time to time for improvements which will enhance performance and eliminate drawbacks which have been discovered during use of the product.

SUMMARY OF THE INVENTION

The present invention provides an enhanced telecommunications cabinet assembly designed to satisfy the aforementioned need. The cabinet assembly of the present invention has a removable front cover, a removable top cover, a movable wiring interconnect management adapter tray, and a plurality of modular interconnect panels removably supported by the movable adapter tray. The movable adapter tray supporting the interconnect panels can be lifted from the top of a chassis of the cabinet assembly with the top cover removed and with the front cover in place or slid forward of the top cover with the front cover removed and with the top cover in place. These features of the cabinet assembly provide an optimum number of ways to access the wiring interconnections housed within the cabinet assembly.

Accordingly, the present invention is directed to an enhanced telecommunications cabinet assembly for enclosing wiring interconnections. The enhanced cabinet assembly comprises: (a) a chassis having a bottom wall with opposite side portions and opposite front and rear end portions and a pair of opposite sidewalls each attached along one of the side portions of the bottom wall and extending upward therefrom so as to define an interior cavity in the chassis between the sidewalls and above the bottom wall thereof, the chassis further having a pair of lower guide members disposed in the interior cavity and spaced apart from one another and each attached on the bottom wall adjacent to one of the sidewalls; (b) a movable interconnect management adapter tray for mounting a plurality of modular interconnect panels, the movable adapter tray being positioned in the interior cavity of the chassis by the lower guide members on the bottom wall of the chassis and capable of undergoing at least one of being lifted upward relative to the bottom wall for removal from the storage cavity of the chassis or slidably moved forward and backward along the lower guide members on the bottom wall toward and away from the front and rear end portions of the bottom wall of the chassis; (c) a front cover for enclosing the interior cavity of the chassis at the front end portion of the bottom wall thereof so as to block access to a front side of the movable adapter tray and modular interconnect panels thereon, the front cover also being movable for exposing the interior cavity of the chassis at the front end portion of the bottom wall thereof so as to provide access to the front side of the movable adapter tray and modular interconnect panels thereon and allow sliding movement of the movable adapter tray between front and rear end portions of the bottom wall of the chassis; and (d) a top cover for enclosing the interior cavity of the chassis above the bottom wall thereof and between the opposite sidewalls thereof so as to block access to the movable adapter tray from above, the top cover also being movable for exposing the interior cavity of the chassis above the bottom wall thereof and between the opposite sidewalls thereof so as to provide access to the movable adapter tray from above.

More particularly, the movable adapter tray includes a main plate with opposite front and rear ends and a plurality of upright posts attached on the main plate adjacent to the front end thereof and extending upward therefrom. The modular interconnect panels can be removably mounted on the upright posts of the movable adapter tray. In one embodiment, the upright posts having upper and lower portions lying in a common vertical plane such that the modular interconnect panels are mounted to the respective upper and lower portions of the posts in vertically aligned rows. In another embodiment, the upright posts have upper portions, lower portions and intermediate portions extending between and interconnecting the upper and lower portions. The upper portions are offset rearwardly and the lower portions are offset forwardly of the intermediate portions such that the modular interconnect panels can be mounted to the respective lower, intermediate and upper portions of the posts in front to back staggered rows.

The movable adapter tray also includes a plurality of tongue plates attached to and extending forwardly from the front end of the main plate and defining slots for receiving cable tie elements. Further, a hook element is attached to and projects upward from the bottom wall of the chassis intermediate between the front and rear end portions thereof. The main plate of the movable adapter tray has a slot element attached thereon adjacent to the rear end thereof and being aligned with and adapted to receive the hook element on the bottom wall of the chassis to limit forward sliding movement of the movable adapter tray along the lower guide members and relative to the bottom wall of the chassis. Furthermore, there is a pair of fastener elements spaced apart from one another and attached to and protruding upward from the rear end portion of the bottom wall. The main plate of the movable adapter tray has a pair of fastener elements spaced apart from one another and mounted on the rear end of the main plate for releasably fastening to the fastener elements on the rear end portion of the bottom wall of the chassis to secure the movable adapter tray within the interior cavity of the chassis.

Further, the bottom wall of the chassis has a pair of hinge elements spaced apart from one another and attached to the front end portion of the bottom wall. The front cover has a pair of hinge elements spaced apart and attached to a lower end portion of the front cover and removably coupled to the hinge elements of the bottom wall of the chassis for removably mounting the front cover in place on the chassis. Also, each of the sidewalls has a front end portion and a fastener element attached thereon. The front cover further has a pair of fastener elements spaced apart and mounted thereon such that each of the fastener elements releasably fastens to one of the fastener elements on the front end portions of the sidewalls to secure the front cover in place on the chassis.

In addition, each of the sidewalls has an upper guide member formed on and extending along an upper end portion of the sidewall. The top cover has a pair of outer guide members each formed on one of a pair of opposite side portions of the top cover for removably slidably interfitting with the upper guide member on one of the upper end portions of the sidewalls of the chassis to allow sliding movement of the top cover forward toward and rearward from the rear end portions of the sidewalls of the chassis for mounting the top cover in place on the chassis.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "top", "bottom", "upwardly", "downwardly", and the like are words of convenience and are not to be construed as limiting terms.

Figure 1:
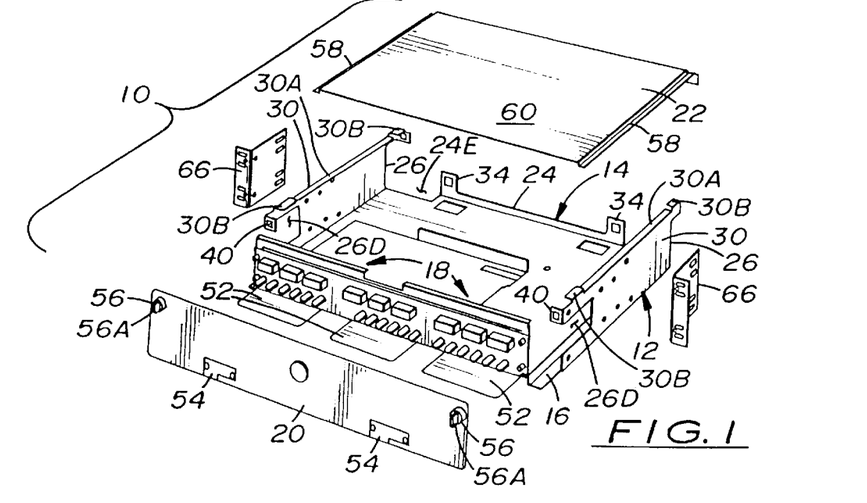
FIG. 1 is an exploded perspective view of an enhanced telecommunications cabinet assembly of the present invention.
Figure 2:
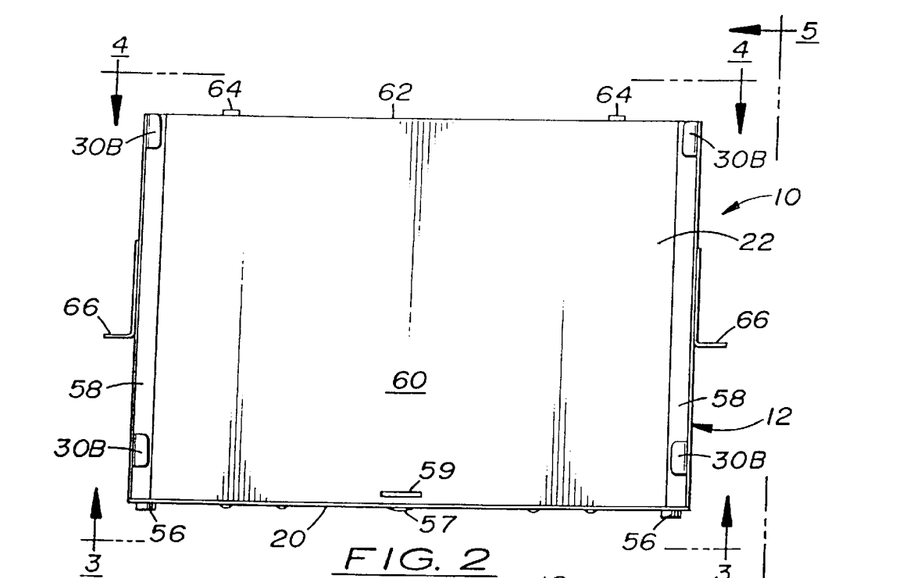
FIG. 2 is a top plan view of the cabinet assembly of FIG. 1.
Figure 3:
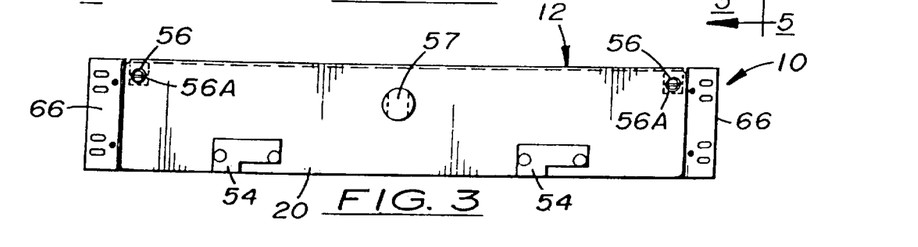
FIG. 3 is a front elevational view of the cabinet assembly as seen along line 3—3 of FIG. 2.

Referring to the drawings and particularly to FIG. 1, there is illustrated an enhanced telecommunications cabinet assembly of the present invention, generally designated 10, for use in enclosing and accessing telecommunications wiring interconnections. The cabinet assembly 10 basically includes a base unit or chassis 12 defining an interior cavity 14, a movable interconnect management adapter tray 16 supported in the interior cavity 14 of the chassis 12, a plurality of modular interconnect panels 18 mounted on the movable adapter tray 16, and front and top covers 20, 22 on the chassis 12.

Referring to FIGS. 1 and 10 to 13, the chassis 12 of the cabinet assembly includes a bottom wall 24 and a pair of opposite sidewalls 26. The bottomwall 24 of the chassis 12 is of generally planar configuration and has opposite front and rear end portions 24A, 24B and a pair of opposite side portions 24C. Each sidewall 26 of the chassis 12 is of generally planar configuration and has opposite rear and front end portions 26A, 26B and an upper end portion 26C. Each sidewall 26 is rigidly attached along one of the side portions 24C of the bottom wall 24 and extends upward therefrom so as to define therewith the interior cavity 14 in the chassis 12 between the opposite sidewalls 26 and above the bottom wall 24 thereof.

The chassis 12 also includes a pair of lower guide members 28 and a pair of upper guide members 30. The lower guide members 28 have generally linear configurations and are spaced apart from one another and spaced inwardly from the opposite side portions 24C of the bottom wall 24. Each lower guide member 28 is mounted in the interior cavity 14 on a top surface 24D of the bottom wall 24 and adjacent to one of the sidewalls 26. More particularly, each lower guide member 28 includes a lower base portion 28A of a flat configuration and rigidly attached to the top surface 24D of the bottom wall 24, an upper rail portion 28B of a flat configuration and disposed above the lower base portion 28A, and an upright middle brace portion 28C of a flat configuration and extending vertically between and rigidly attached at its opposite upper and lower edges along respective outer edges of the lower base portion 28A and upper rail portion 28B such that the upper rail portion 28B is spaced above the lower base portion 28A and extends generally parallel thereto with the upright middle brace portion 28C extending generally perpendicular to both the lower base portion 28A and upper rail portion 28B. Additionally, each lower guide member 28 further includes a short length upright guide element 29 located on the front portion 24A of the bottom wall 24 and in alignment with the upper rail portion 28B for supporting the adapter tray 16 as further described below.

Each upper guide member 30 is formed on and extends along the upper end portion 26C of one of the sidewalls 26. More specifically, each upper guide member 30 includes an elongated upper guide track portion 30A of a flat configuration and rigidly attached along and extending inwardly from the upper end portion 26C of the one sidewall 26 and a pair of upper end guide tab portions 30B each of a flat configuration and being rigidly attached to and extending inwardly from the upper end portion 26C of the one sidewall 26 at the respective rear and front end portions 26A, 26B thereof. The upper end guide tab portions 30 are spaced above the plane of the upper guide track portion 30A and substantially shorter in length than the upper guide track portion 30A.

Figure 11:
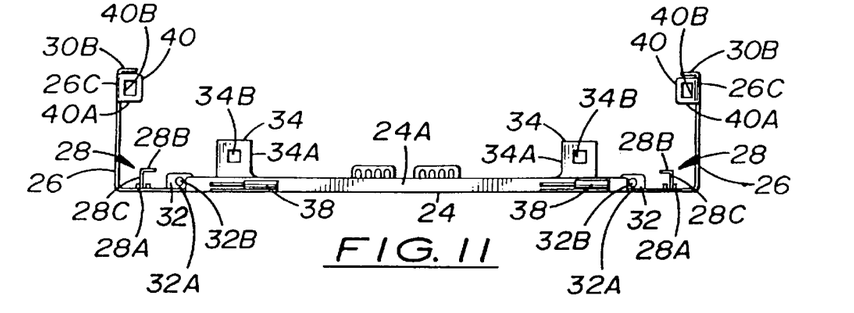
FIG. 11 is a front elevational view of the chassis as seen along line 11—11 of FIG. 10.
Figure 12:
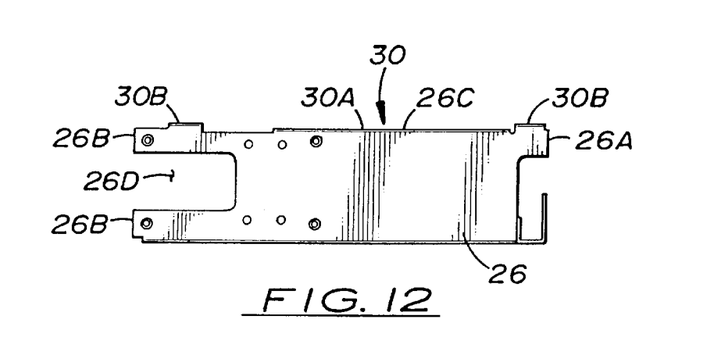
FIG. 12 is a side elevational view of the chassis as seen along line 12—12 of FIG. 10.
Figure 13:
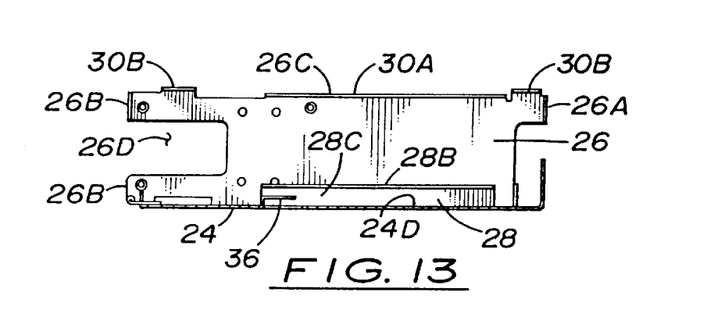
FIG. 13 is a longitudinal sectional view of the chassis taken along line 13—13 of FIG. 10.

The chassis 12 further has mounted thereto a pair of rear fastener elements 32, a pair of rear securement elements 34, a hook element 36, a pair of front hinge elements 38 and a pair of front securement elements 40. The rear fastener elements 32 are spaced apart from one another and spaced inwardly from the rear end portions 26A of the sidewalls 26. Each of the rear fastener elements 32 takes the form of a fastener mounting tab 32A rigidly attached to and protruding upwardly from the rear end portion 24B of the bottom wall 24 and a push-pull type well-known fastener 32B mounted to the tab 32A. The rear securement elements 34 are spaced apart from one another and spaced inwardly from the respective rear fastener elements 32. Each rear securement element 34 takes the form of a rear securement tab 34A rigidly attached to and protruding upwardly from the rear end portion 24B of the bottom wall 24. Each rear securement tab 34A has an opening 34B therethrough. As seen in FIG. 11, each rear securement tab 34A protrudes to a greater height above the bottom wall 24 than does each fastener mounting tab 32A. The hook element 36 rigidly attaches to and projects upward from the top surface 24D of the bottom wall 24. The hook element 36 faces rearwardly and is located intermediately between and spaced from the front and rear end portions 24A, 24B of the bottom wall 24 but somewhat closer to the front end portion 24A than to the rear end portion 24B thereof. The front hinge elements 38 are spaced apart from one another and spaced inwardly from the front end portions 26B of the sidewalls 26 and are attached to the front end portion 24A of the bottom wall. The front securement elements 40 are spaced apart from one another and spaced inwardly from the respective front end portions 26B of the sidewalls 26. Each front securement element 40 takes the form of a front securement tab 40A rigidly attached to and protruding upwardly from the front end portion 24A of the bottom wall 24. Each front securement tab 40A has an opening 40B therethrough.

Referring to FIGS. 1 and 6 to 9, the movable adapter tray 16 of the cabinet assembly 10 is positioned in the interior cavity 14 of the chassis 12 by the lower guide members 28 on the bottom wall 24 of the chassis 12. The movable adapter tray 16, depending upon the arrangement of the modular interconnect panels 18 supported by the tray 16, is capable of undergoing one or both of being lifted upward relative to the bottom wall 24 for removal from the interior cavity 14 of the chassis 12 or slidably moved forward and backward along the lower guide members 28 toward and away from the front and rear end portions 24A, 24B of the bottom wall 24.

Figure 8:
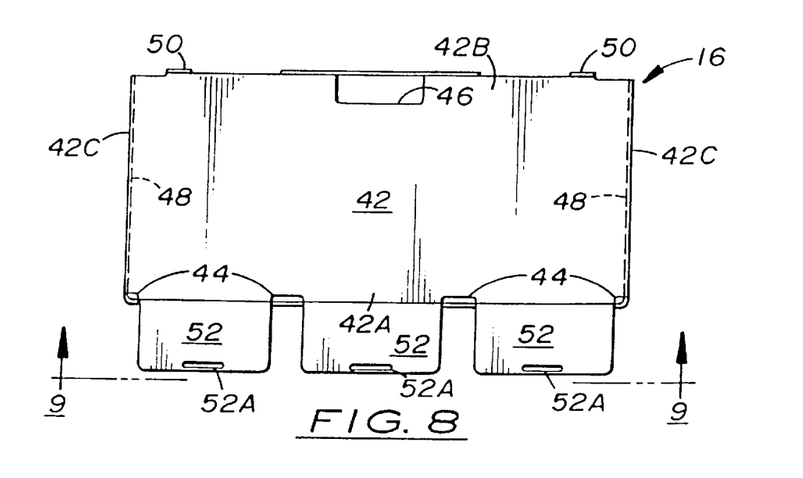
FIG. 8 is a top plan view of the removable adapter tray by itself.
Figure 9:
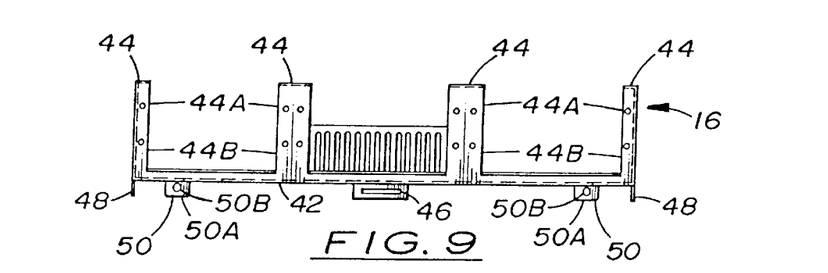
FIG. 9 is a front elevational view of the removable adapter tray as seen along line 9—9 of FIG. 8.
Figure 10:
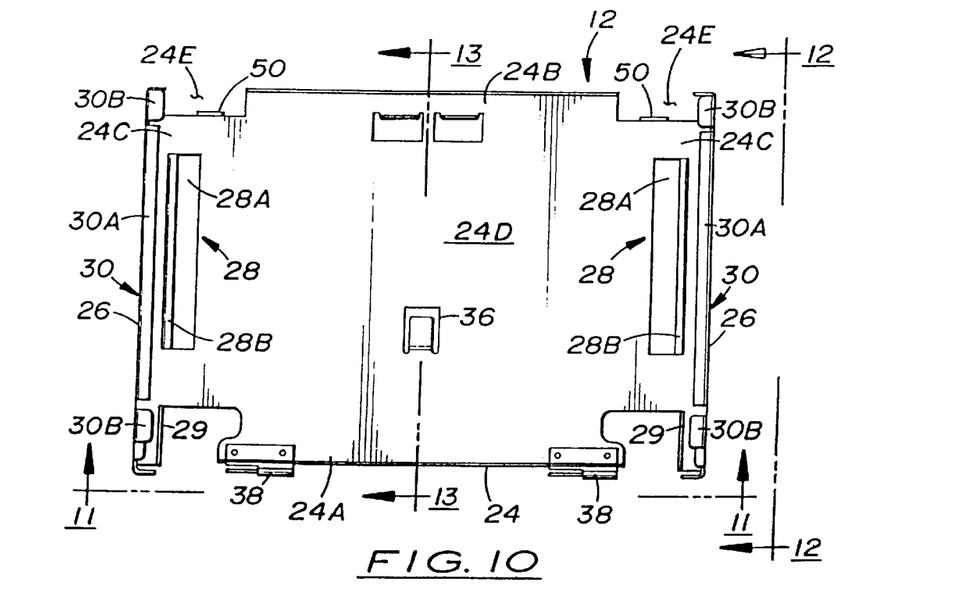
FIG. 10 is a top plan view of a chassis of the cabinet assembly of FIG. 1.

More specifically, the movable adapter tray 16 includes a main plate 42, a plurality of upright posts 44 and a slot element 46. The main plate 42 is of generally flat configuration and has opposite front and rear ends 42A, 42B and a pair of opposite sides 42C. The main plate 42 also has a pair of elongated rigid runners 48 of generally flat configuration rigidly attached along and extending vertically below the opposite sides 42C of the main plate 42. The runners 48 on the sides 42C of the main plate 42 support the tray 16 in a spaced relationship above the top surface 24D of the bottom wall 24 and position the tray 16 just inwardly of and along the inner edges of the upper rail portions 28B of the lower guide members 28 so as to allow the tray 16 either to be slidable moved along the lower guide members 28 or lifted upwardly from between the lower guide members 28.

The slot element 46 is attached on the main plate 42 centrally along and adjacent to the rear end 42B thereof and extends below the main plate 42, as seen in FIG. 9, into the space between the main plate 42 and bottom wall 24 provided by the runners 48. The slot element 46 is aligned with and adapted to receive the hook element 36 on the bottom wall 24 of the chassis 12 to limit the length of travel of the forward sliding movement of the movable tray 16 along and between the lower guide members 28 on the bottom wall 24. Once the tray 16 has been extended past the front end portion 24A of the bottom wall 24 and the hook element 36 interfitted within the slot element 46, the tray 16 is retained by the hook element 36 extending along a generally horizontal plane in the extended position.

The movable adapter tray 16 also has a pair of back fastener elements 50 spaced apart from one another and mounted on the rear end 42B of the main plate 42 for releasably fastening to the rear fastener elements 32 on the rear end portion 24B of the bottom wall 24 of the chassis 12 to secure the movable tray 16 within the interior cavity 14 of the chassis 12. Each back fastener element 50 takes the form of a back fastener tab 50A rigidly attached to and protruding downwardly from the rear end 42B of the main plate 42 of the tray 16 and aligned with one of the rear fastener elements 32 on the bottom wall 24. A hole 50B is formed through each of the back fastener tabs 50 so as to receive the fastener 32B of the one of the rear fastener elements 32 on the rear end portion 28B of the bottom wall 24. The movable tray 16 further also includes a plurality of tongue plates 52 of generally flat shape and attached to and extending forwardly from the front end 42A of the main plate 42 of the tray 16. The tongue plates 52 have respective slots 52A defined along front edges thereof for receiving cable tie elements or the like.

Figure 14:
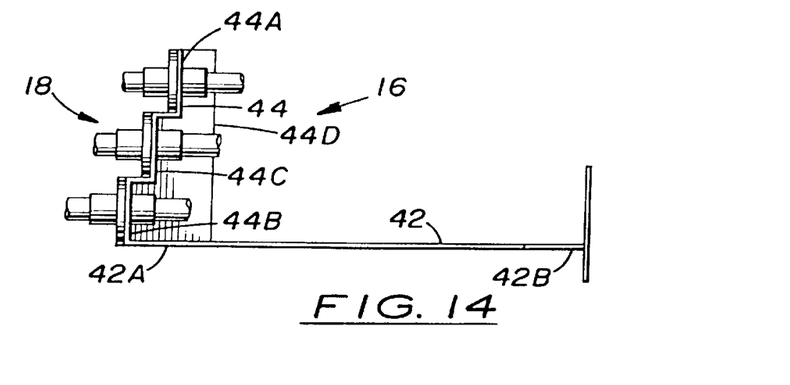
FIG. 14 is side elevational view of another embodiment of the removable adapter tray of the cabinet assembly which mounts modular interconnect panels in front to back offset or staggered rows.

The modular interconnect panels 18 are removably mounted on the movable adapter tray 16 and particularly on the upright posts 44 supported on the movable tray 16. The upright posts 44 are laterally aligned with and spaced apart from one another adjacent to the front end portion 42A of the main plate 42 of the tray 16 and are rigidly attached thereon and extend upwardly therefrom. There are two embodiments of the upright posts 44 provided for accommodating different arrangements of the modular interconnect panels 18 thereon to provide different numbers of ports for making interconnections, such as thirty-six ports in a first embodiment and fifty-four ports in a second embodiment. In the first embodiment shown in FIGS. 1 and 7, the upright posts 44 have upper and lower portions 44A, 44B which lie along a common vertical plane such that the modular interconnect panels 18 are mounted to the respective upper and lower portions 44A, 44B of the posts 44 in vertically aligned rows. In the second embodiment shown in FIG. 14, the upright posts 44 have upper, lower and intermediate portions 44A, 44B, 44C provided in a stepped arrangement wherein the intermediate portions 44C extend between and interconnect the upper and lower portions 44A, 44B such that the upper portions 44A are offset in a rearward direction from the respective intermediate portions 44C and the lower portions 44B are offset in a forward direction from the respective intermediate portions 44C. The modular interconnect panels 18 are thus mounted to the respective lower, intermediate and upper portions 44B, 44C, 44A of the posts 44 in rows staggered or offset from front to back with upper and lower edges of the panels 18 slightly overlapped. Additionally, for structural integrity, a vertical brace 44D is provided on the rear side of the respective lower, intermediate and upper portions 44B, 44C, 44A of each of the offset posts 44. The brace 44D extends upwardly from the main plate 42 and perpendicular to the rear side of each offset post 44.

Referring to FIGS. 1 to 3, 5 and 7, the removable front cover 20 is provided at the front end portion 24A of the bottom wall 24 across the front of the interior cavity 14 of the chassis 12 and between front end portions 26B of the opposite sidewalls 26 thereof. The front cover 20 can be made of a transparent material, such as a suitable plastic, and has a pair of bottom hinge elements 54 spaced apart from one another and attached to a lower end portion 20A of the front cover 20. The bottom hinge elements 54 are removably coupled to the front hinge elements 38 on the bottom wall 24 of the chassis 12 for mounting the front cover 20 in place on the chassis 12 so as to block access to a front side of the movable adapter tray 16 and the modular interconnect panels 18 mounted thereon. The bottom hinge elements 54 are removable from the front hinge elements 38 on the bottom wall 24 so as to remove the front cover 20 and expose the front end of the interior cavity 14 and thereby provide access to the front side of the movable tray 16 and the modular interconnect panels 18 thereon. Also, with the front cover 20 removed, the movable tray 16 can be slidable moved beyond the front end portion 24A of the bottom wall 24 of the chassis 12. The front cover 20 also has a pair of upper fastener elements 56 spaced apart from one another and mounted thereon at upper side corners for releasably fastening to the front securement elements 40 on the front end portions of the sidewalls 26 to secure the front cover 20 in place on the chassis 12. The upper fastener elements 56 take the form of a push-pull type well-known fastener 56A mounted to the front cover 20. Additionally, located in the mid-portion of the front cover 20 is an optional lock element 57 that engages a corresponding slot 59 provided in the front end portion of the top cover 22. Engagement of the lock element 57 with slot 59 prevents unintentional removal of the front cover 20 and the top cover 22. Thus, the front cover 20 is provided for enclosing the interior cavity 14 of the chassis 12 at the front end portion 24A of the bottom wall 24 thereof so as to block access to a front side of the movable adapter tray 16 and modular interconnect panels 16 thereon; however, the front cover 20 also is movable for exposing the interior cavity 14 of the chassis 12 at the front end portion 24A of the bottom wall 24 thereof so as to provide access to the front side of the movable adapter tray 16 and modular interconnect panels 18 thereon and allow slidable movement of the movable adapter tray 16 toward and away from front and rear end portions 24A, 24B of the bottom wall 24 of the chassis 12.

Figure 4:
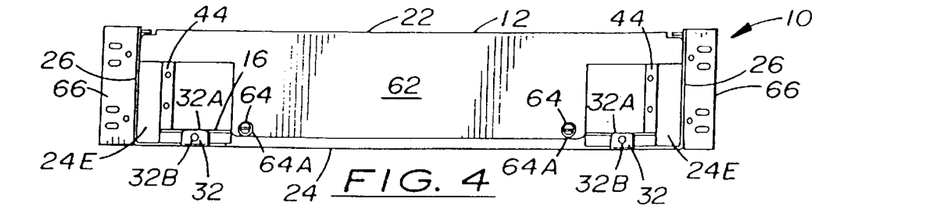
FIG. 4 is a rear elevational view of the cabinet assembly as seen along line 4—4 FIG. 2.
Figure 5:
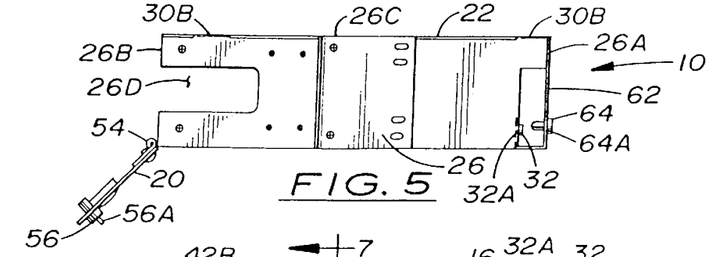
FIG. 5 is a side elevational view of the cabinet assembly as seen along line 5—5 of FIG. 2.
Figure 6:
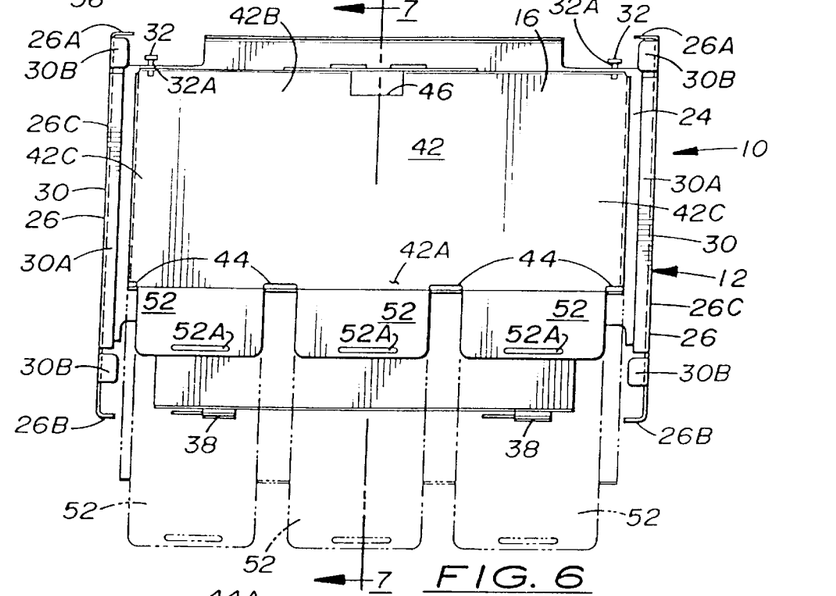
FIG. 6 is top plan view of the cabinet assembly similar to that of FIG. 2 but with a top cover thereof removed to expose one embodiment of a removable adapter tray of the cabinet assembly which mounts modular interconnect panels in vertically aligned rows.
Figure 7:
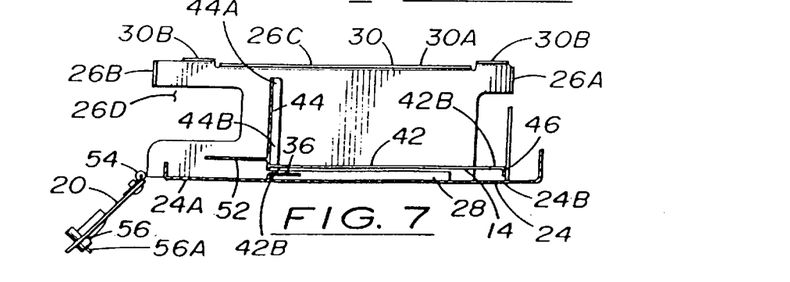
FIG. 7 is a longitudinal sectional view of the cabinet assembly taken along line 7—7 of FIG. 6.

Referring to FIGS. 1, 2, 4 and 5, the removable top cover 22 is provided at and between the upper end portions 26C and rear end portions 26A of the sidewalls 26 of the chassis 12 and across the top and rear of the interior cavity 14 of the chassis 12 for enclosing the interior cavity 14 of the chassis 12 above and along the rear of the bottom wall 24 thereof. The top cover 22 has a pair of outer guide members 58 of generally flat configuration. Each of the outer guide members 58 is formed on one of a pair of opposite side portions 22A of the top cover 22 for removably slidably interfitting with the upper guide member 30 on one of the upper edge portions 26C of the sidewalls 26 of the chassis 12 to allow sliding movement of the top cover 22 forwardly toward and rearwardly from the rear end portion 24A of the sidewalls of the chassis 12 for mounting the top cover 22 in place on the chassis so as to block access to the upper and rear sides of the movable tray 16 and the modular interconnect panels 18 thereon and for removing the top cover 22 from the chassis 12 so as to provide access to the upper and rear sides of the movable tray 16 and the modular interconnect panels 18 thereon. The top cover 22 includes a top portion 60 and a rear portion 62 for enclosing the interior cavity 14 of the chassis 12 between the rear end portions 26A of the opposite sidewalls 26 thereof when the top cover 22 encloses the interior cavity 14 of the chassis 12 between the upper end portions 26C of the opposite sidewalls 26. As seen in FIG. 4, the rear portion 62 of the top cover 22 has a pair of rear fastener elements 64 in the form of a push-pull type well-known fastener 64A which fasten with the rear securement elements 34 of the chassis 12.

By way of example only, the chassis 12 can be made of high quality, extremely durable, sixteen gauge cold rolled steel with an aesthetically pleasing black electrostatically applied powder paint. The cabinet assembly 10 also is provided with a pair of side brackets 66 connected to the exteriors of the sidewalls 26 of the chassis 12 for mounting the cabinet assembly 10 between vertical racks (not shown) or the like. The side brackets 66 may be either mounted at the midsection of the sidewalls 26 or at the front thereof for a flush mounting application. Further, there are openings 24E, 26D provided respectively adjacent to the rear end portion 24B of the bottom wall 24 and the front end portions 26B of the sidewalls 26 which permit passage of distribution cables and patch cords (not shown) into and from the interior cavity 14 of the chassis 12 at front and rear sides of the modular interconnect panels 18.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An enhanced telecommunications cabinet assembly for enclosing wiring interconnections, said cabinet assembly comprising:

(a) a chassis having a bottom wall with opposite side portions and opposite front and rear end portions and a pair of opposite sidewalls each attached along one of said side portions of said bottom wall and extending upwardly therefrom so as to define an interior cavity in said chassis between said sidewalls and above said bottom wall thereof, said chassis further having a pair of lower guide members spaced apart from one another and each attached on said bottom wall adjacent to one of said sidewalls and including a hook element attached to and projecting upwardly from said bottom wall of said chassis intermediate between said front and rear end portions thereof;

(b) a movable interconnect management adapter tray for mounting a plurality of modular interconnect panels, said movable adapter tray being positioned in said interior cavity of said chassis by said lower guide members on said bottom wall of said chassis, said movable adapter tray capable of undergoing at least one of being lifted upward relative to said bottom wall for removal from said storage cavity of said chassis or slidably moved forward and backward along said lower guide members on said bottom wall toward and away from said front and rear end portions of said bottom wall of said chassis, said movable adapter tray including a main plate with opposite front and rear ends and a plurality of upright posts attached on said main plate adjacent to said front end thereof and extending upwardly therefrom for removably mounting the modular interconnect panels on said upright posts of said movable adapter tray, said main plate of said movable adapter tray having a slot element attached thereon adjacent said rear end thereof and being aligned with and adapted to receive said hook element on said bottom wall of said chassis to limit forward sliding movement of said movable adapter tray on said slide tracks and relative to said bottom wall of said chassis;

(c) a front cover for enclosing said interior cavity of said chassis at said front end portion of said bottom wall thereof so as to block access to a front side of said movable adapter tray and modular interconnect panels thereon, said front cover also being movable for exposing said interior cavity of said chassis at said front end portion of said bottom wall thereof so as to provide access to said front side of said movable adapter tray and modular interconnect panels thereon and allow slidable movement of said movable adapter tray between said front and rear end portions of said bottom wall of said chassis; and (d) a top cover for enclosing said interior cavity of said chassis above said bottom wall thereof and between said opposite sidewalls thereof so as to block access to said movable adapter tray from above, said top cover also being movable for exposing said interior cavity of said chassis above said bottom wall thereof and between said opposite sidewalls thereof so as to provide access to said movable adapter tray from above.

2. The cabinet assembly as recited in claim 1, wherein said upright posts having upper and lower portions lying in a common vertical plane for removably mounting the modular interconnect panels to said respective upper and lower portions of said posts in vertically aligned rows.

3. The cabinet assembly as recited in claim 1, wherein said upright posts have upper portions, lower portions and intermediate portions extending between and interconnecting said upper and lower portions, said upper portions being offset rearwardly and said lower portions being offset forwardly of said intermediate portions such that the modular interconnect panels can be mounted to said respective lower, intermediate and upper portions of said posts in rows being staggered front to back rows with respect to one another.

4. The cabinet assembly as recited in claim 1, wherein:

said bottom wall of said chassis has a pair of hinge elements spaced apart from one another and attached to said front end portion of said bottom wall; and said front cover has a pair of hinge elements spaced apart and attached to a lower end portion of said front cover and removably coupled to said hinge elements of said bottom wall of said chassis for removably mounting said front cover in place on said chassis.

5. The cabinet assembly as recited in claim 4, wherein: each of said sidewalls has a front end portion and a fastener element attached thereon; and said front cover further has a pair of fastener elements spaced apart and mounted thereon, each of said fastener elements of said front cover for releasably fastening to one of said fastener elements on said front end portions of said sidewalls to secure said front cover in place on said chassis.

6. The cabinet assembly as recited in claim 1, wherein: each of said sidewalls has an upper guide member formed on and extending along an upper end portion of said sidewall;

said top cover having a pair of outer guide members each formed on one of a pair of opposite side portions of said top cover for removably slidably interfitting with said upper guide member on one of said upper end portions of said sidewalls of said chassis to allow sliding movement of said top cover forward toward and rearward from said rear end portions of said sidewalls of said chassis for mounting said top cover in place on said chassis.

7. The cabinet assembly as recited in claim 6, wherein said top cover includes a rear portion for enclosing said interior cavity of said chassis between rear end portions of said opposite sidewalls thereof when said top cover encloses said interior cavity of said chassis between said upper end portions of said opposite sidewalls.

8. The cabinet assembly as recited in claim 1, wherein:

said chassis has a pair of fastener elements spaced apart from one another and attached to and protruding upwardly from said rear end portion of said bottom wall of said chassis; and said main plate of said movable adapter tray has a pair of fastener elements spaced apart and mounted on said rear end of said main plate for releasably fastening to said fastener elements on said rear end portion of said bottom wall of said chassis to secure said movable adapter tray within said interior cavity of said chassis.

9. The cabinet assembly as recited in claim 1, wherein said movable adapter tray has a plurality of tongue plates attached to and extending forwardly from said front end of said main plate and defining slots for receiving cable tie elements.

10. An enhanced telecommunications cabinet assembly for enclosing wiring interconnections, said cabinet assembly comprising:

(a) a chassis having a bottom wall and a pair of opposite sidewalls attached along a pair of opposite side portions of said bottom wall and extending upwardly therefrom so as to define an interior cavity in said chassis between said sidewalls and above said bottom wall thereof, said chassis further having a pair of lower guide members spaced apart from one another and each attached on said bottom wall adjacent to one of said sidewalls, a pair of upper guide members each formed on and extending along an upper end portion of one of said sidewalls, a pair of first fastener elements spaced apart from one another and attached to and protruding upwardly from a rear end portion of said bottom wall, a pair of first hinge elements spaced apart from one another and attached to a front end portion of said bottom wall, a pair of second fastener elements spaced apart from one another and attached to a front end portion of one of said sidewalls, and a hook element attached to and projecting upwardly from said bottom wall intermediate between said front and rear end portions thereof; and (b) a movable interconnect management adapter tray positioned in said interior cavity of said chassis by said lower guide members on said bottom wall of said chassis, said movable adapter tray capable of undergoing at least one of being lifted upward relative to said bottom wall for removal from said interior cavity of said chassis or being slidably moved forward and backward along said lower guide members on said bottom wall toward and away from said front and rear end portions of said bottom wall of said chassis, said movable adapter tray having a plurality of upright posts and means disposed rearwardly of said upright posts for receiving said hook element on said bottom wall of said chassis to limit forward sliding movement of said movable adapter tray along said lower guide members and relative to said bottom wall, said movable adapter tray also having a pair of third fastener elements spaced apart and mounted thereon for releasably fastening to said second fastener elements on said rear end portion of said bottom wall of said chassis to secure said movable adapter tray within said interior cavity of said chassis, said movable adapter tray further having a plurality of tongue plates attached thereto and extending forwardly therefrom and defining slots for receiving cable tie elements;

(c) a plurality of modular interconnect panels removably mounted on said upright posts of said movable tray;

(d) a removable front cover for enclosing said interior cavity of said chassis between front ends of said opposite sidewalls thereof, said front cover having a pair of second hinge elements spaced apart and attached to a lower end portion of said front cover and removably coupled to said first hinge elements of said chassis for mounting said front cover in place on said chassis so as to block access to a front side of said movable adapter tray and modular interconnect panels thereon and for removing said front cover from said chassis so as to provide access to said front side of said movable adapter tray and modular interconnect panels thereon and allow sliding movement of said movable adapter tray between said front and rear end portions of said bottom wall of said chassis, said front cover also having a pair of fourth fastener elements spaced apart and mounted thereon for releasably fastening to said second fastener elements on said front end portions of said sidewalls of said chassis to secure said front cover in place on said chassis; and (e) a top cover for enclosing said interior cavity of said chassis above said bottom wall thereof and between said upper end portions and rear end portions of said sidewalls thereof, said top cover having a pair of outer guide members each formed on one of a pair of opposite side portions of said top cover for removably slidably interfitting with said upper guide member on one of said upper edge portions of said sidewalls of said chassis to allow sliding movement of said top cover forward toward and rearward from said rear end portions of said sidewalls of said chassis for mounting said top cover in place on said chassis so as to block access to said movable adapter tray from above and for removing said top and rear cover from said chassis so as to provide access to said movable adapter tray from above.

* * * * *